United States Patent [19]

Leete

[11] Patent Number: 4,612,635
[45] Date of Patent: Sep. 16, 1986

[54] SEQUENTIAL DATA TRANSMISSION SYSTEM

[75] Inventor: Tom G. Leete, Plano, Tex.

[73] Assignee: Honeywell Inc., Phoenix, Ariz.

[21] Appl. No.: 586,154

[22] Filed: Mar. 5, 1984

[51] Int. Cl.[4] .............................................. H04J 3/26
[52] U.S. Cl. .................................. 370/89; 340/825.05
[58] Field of Search ....................... 370/86, 88, 89, 90; 340/825.05

[56] References Cited

U.S. PATENT DOCUMENTS

| | | | |
|---|---|---|---|
| 3,787,627 | 1/1974 | Abramson et al. | 370/89 |
| 3,863,220 | 1/1975 | Osawa et al. | 370/89 |
| 3,919,483 | 11/1975 | Gindi et al. | 370/86 |
| 3,919,484 | 11/1975 | Maxemchuk | 370/86 |
| 4,019,176 | 6/1975 | Cour et al. | 370/89 |
| 4,078,228 | 3/1978 | Miyazaki | 370/89 |
| 4,199,662 | 4/1980 | Lowe | 370/86 |
| 4,237,553 | 12/1980 | Larsen | 370/89 |
| 4,383,314 | 5/1983 | Tam | 370/86 |

Primary Examiner—Douglas W. Olms
Attorney, Agent, or Firm—A. A. Sapelli; J. S. Solakian; A. Medved

[57] ABSTRACT

The present invention relates to a data transmission system, for transmitting information from a first end-user device to a second end-user device, which comprises a plurality of channel elements, each channel element having an input and an output terminal adapted to receive and transmit, respectively, serial digital data having a predetermined format. Each channel element also has a plurality of parallel input terminals and a plurality of parallel output terminals adapted to receive and transmit, respectively, parallel digital data. The parallel output terminals of each of the channel elements is operatively connected to the parallel input terminals of a next adjacent channel element thereby connecting the channel elements in a ring configuration. Each channel element receives the serial digital data from a plurality of associated end-user devices and transmits the serial digital data in parallel to the next adjacent channel element until the parallel digital data has traversed the entire ring, at which time newly received serial digital data at each channel element is inserted onto the ring. The parallel digital data transferred around the ring is examined by each channel element to extract the parallel digital data determined to be addressed to the channel element.

7 Claims, 8 Drawing Figures

SEQUENTIAL DATA TRANSMISSION SYSTEM

BACKGROUND OF THE INVENTION

The present invention relates to a transmission system, and more particularly, to a digital transmission system for transmitting packets of information over a loop between devices coupled to the loop.

In transmission systems having a plurality of devices, such as telephones, terminals, controllers and processors coupled to a transmission carrier, some form of dialog or communication exchange generally takes place between these devices via the transmission carrier. In order to provide for an orderly exchange of information between devices, various network architectures and schemes have been devised; however, many of the existing transmission systems are complex, inefficient, and require large amounts of complex hardware. This is especially true with transmission systems utilizing packet switching schemes. Such schemes require the use of at least one host processor, a number of communication processors (or front end processors), the software associated with each of the processors which is generally very large and very complex, and communication interface devices which interface or couple a user device with the transmission carrier. The transmission carrier generally transfers the information in a serial fashion.

Hence, it is highly desirable to provide a transmission system for interdevice communication which is high speed and overcomes the disadvantages and limitations of the existing systems. The data transmission system of the present invention transfers packets of information in a parallel fashion via a ring, which forms the transmission carrier of the present invention, thereby overcoming the capacity of speed limitations of the present switching network schemes.

SUMMARY OF THE INVENTION

Therefore, there is supplied by the present invention a data transmission system implementing a communications scheme between a plurality of devices. The data transmission system which transmits information from a first end-user device to a second end-user device comprises a plurality of channel elements, each channel element having an input and an output terminal adapted to receive and transmit, respectively, serial digital data having a predetermined format. Each channel element also has a plurality of parallel input terminals and a plurality of parallel output terminals adapted to receive and transmit, respectively, parallel digital data. The parallel output terminals of each of the channel elements is operatively connected to the parallel input terminals of a next adjacent channel element thereby connecting the channel elements in a ring configuration. Each channel element receives the serial digital data from a plurality of associated end-user devices and transmits the serial digital data in parallel to the next adjacent channel element until the parallel digital data has traversed the entire ring, at which time newly received serial digital data at each channel element is inserted onto the ring. The parallel digital data transferred around the ring is examined by each channel element to extract the parallel digital data determined to be addressed to the channel element.

Accordingly, it is an object of the present invention to provide a transmission system for transferring information between devices.

It is still another object of the present invention to provide a transmission system for transferring information between devices coupled to a transmission carrier.

It is a further object of the present invention to provide a transmission system for transferring information between devices coupled to a transmission carrier, wherein the transmission carrier is in the form of a parallel ring.

These and other objects of the present invention will become more apparent when taken in conjunction with the following description and attached drawings, wherein like characters indicate like parts, and which drawings form a part of the present application.

DETAILED DESCRIPTION

Figure 1:
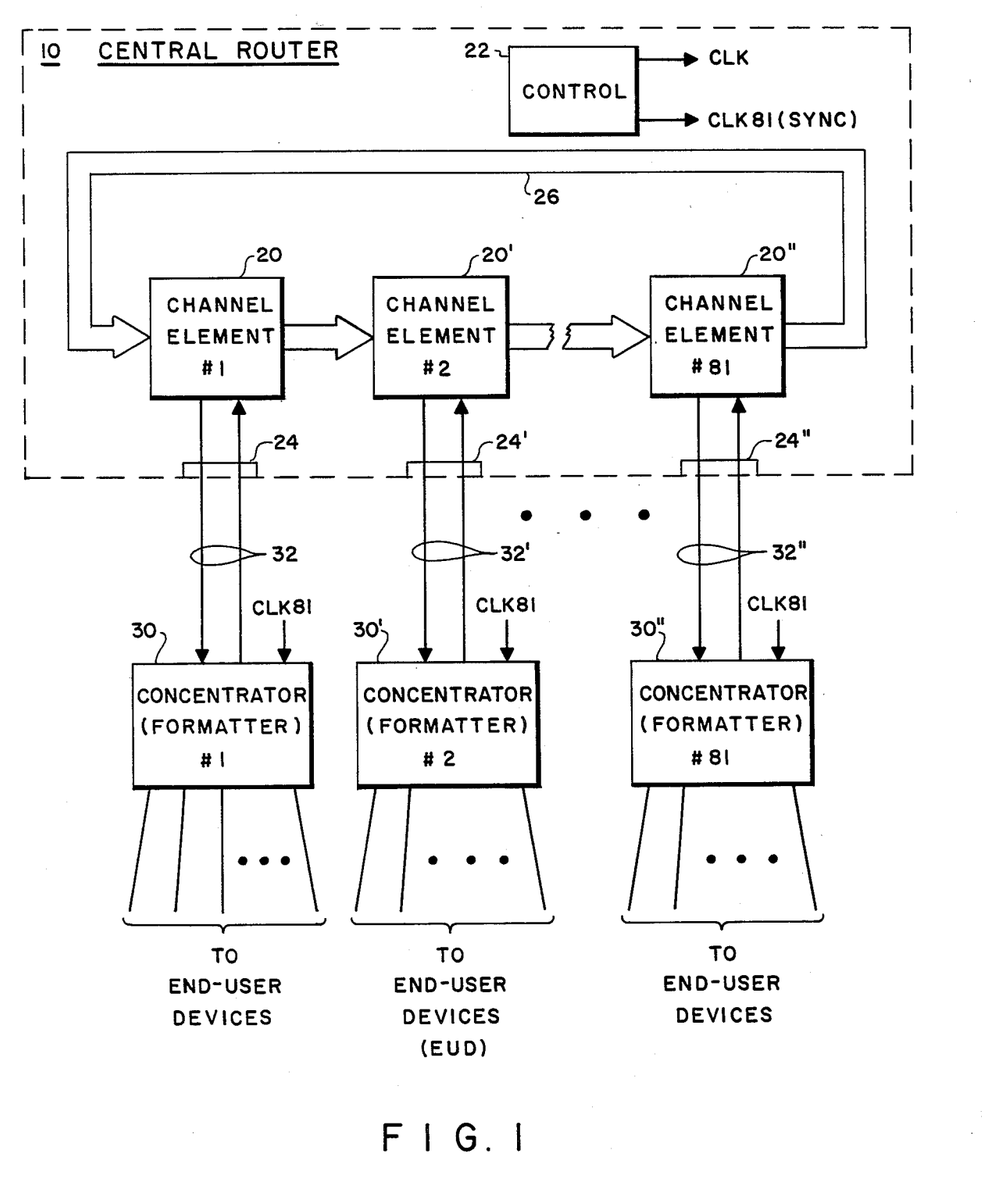
FIG. 1 shows a functional block diagram of the preferred embodiment of the transmission system of the present invention.

FIG. 1 shows a functional block diagram of the preferred embodiment of the transmission system of the present invention. A central router 10 contains a plurality of channel elements 20, 20', 20'', connected in a ring configuration via a loop 26. (NOTE: There exists a difference between a ring and a loop. The difference between a loop and a ring is that a loop generally uses *centralized* control (with one station acting as a polling primary and the others as secondaries), while a ring uses *distributed* control (with all stations sharing control as peers). On a loop, generally the secondaries do not communicate with each other: traffic is exchanged only between the primary and secondaries. On a ring, any station can communicate directoy with any other station. Although the term ring and loop are used interchangeably herein, it will be apparent that the present invention operates as a ring.) Each channel element (CHAN ELEM) 20 has its output connected to the input of the next channel element 20' in the loop; hence, the output of channel element #1 20 is connected to the input of channel element #2 20', . . . , the output of channel element #80 (not shown) is connected to the input of channel element #81 20'', and finally the output of channel element #81 20'' is connected to the input of channel element #1 20. The control element (CON- TROL) 22 generates the clocking signals (CLK), and timing signals, including CLK81 which forms the synchronizing signal, SYNC. Each channel element 20 interfaces with a corresponding concentrator 30 (or sometimes referred to as herein as the formatter). Thus, channel element #1 20 interfaces with concentrator (CONC) #1 30, channel element #2 20' interfaces with concentrator #2 30', . . . , and channel element #81 interfaces with concentrator #81 30". The interface between the respective channel elements 20 and concentrators 30 is via a corresponding link 32, 32', 32". The central router 10 interfaces with each link 32, 32', 32" via the corresponding port 24, 24', 24". Each port 24 of the central router 10 also has a port number which corresponds to the channel element number. Thus, channel element #1 interfaces with port 1, channel element #2 interfaces with port 2, . . . , and channel element #81 interfaces with port 81. Each concentrator 30 interfaces with a plurality of end user devices (or more simply devices) such as telephones, terminals, processors, computers, (not shown) . . . . Each concentrator 30 formats the data received from the end user devices attached thereto into a predetermined format for transmission to its respective channel element 20, and further causes data received from the channel element 20 to be transmitted to a specified destination end user device. CLK81 is coupled to each concentrator 30 to permit the concentrator 30 to synchronize the data transmitted to its corresponding channel element 20. The concentrators 30 append a destination address to packets originating from sources not having the capability of attaching the destination address. The concentrators 30 may take many forms depending upon the data devices coupled to the concentrator, one form including a microprocessor. Concentrators are generally well known in the art and will not be discussed further since it forms no part of the present invention and is not necessary for an understanding of the present invention.

Figure 2:
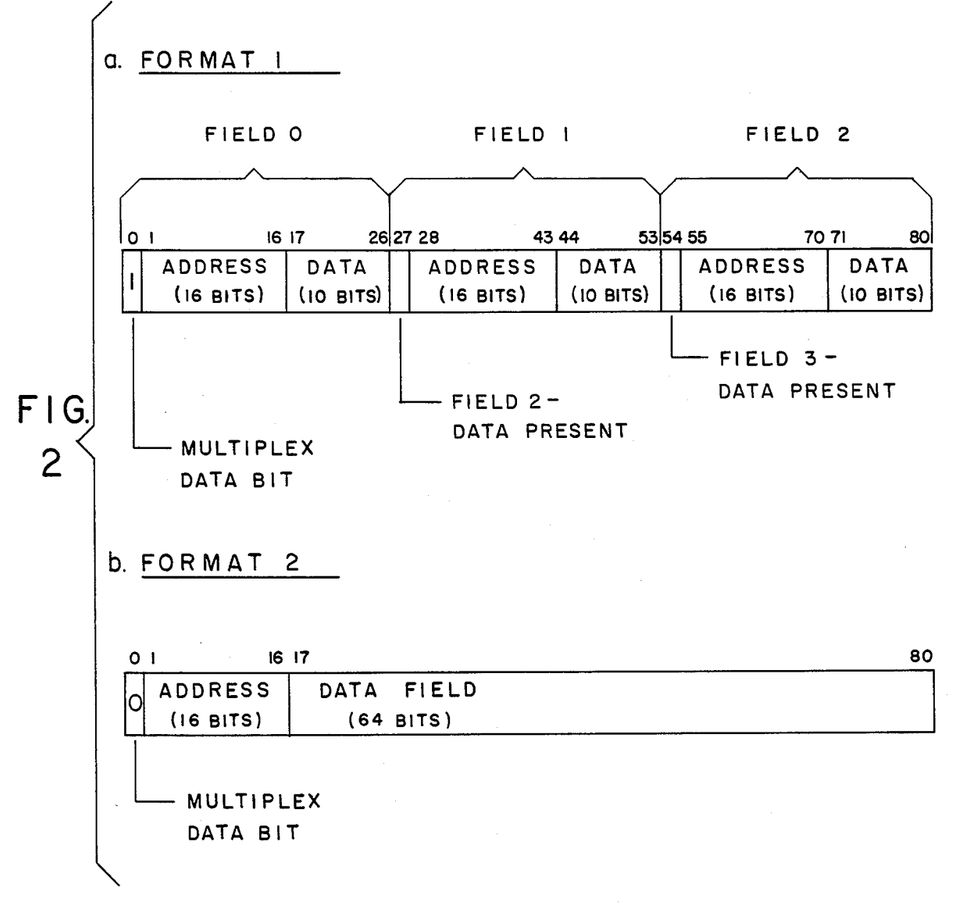
FIG. 2 shows the format of the information transmitted, in the preferred embodiment of the present invention, via a link between a concentrator and a central router.

Referring to FIG. 2, there is shown the formats of the information transmitted via links 32 to and from the concentrators 30. Two formats are utilized by the preferred embodiment of the present invention, format 1 being shown in FIG. 2A and format 2 being shown in FIG. 2B. Each format can be thought of as an 81 bit word. Bit $\emptyset$ is the multiplex data bit which defines the format. If bit $\emptyset$ is a 1, then format 1 word is defined. If bit $\emptyset$ is a $\emptyset$ then format 2 is defined. The format 1 word is divided into three fields of 27 bits each, field $\emptyset$ (or data $\emptyset$) is contained in bits $\emptyset$–26, field 1 (or data 1) is contained in bits 27–53, and field 2 (or data 2) is contained in bits 54–80. When a 1 is present in bit $\emptyset$ defining format 1 and the address portion contains a valid address, data is contained in at least field $\emptyset$. Data may or may not be present in fields 1 and 2. Thus, for format 1 data, bits 27 and 54 are utilized to define if data is present in the respective fields. A one in bit 27 will indicate if data is present in field 1, and a one in bit 54 will indicate data is present in field 2. For field $\emptyset$, bits 1–16 indicate the destination address for the data contained in bits 17–26. Likewise, for field 1, bits 28–43 indicate the destination address for the data contained in bits 44–53 and for field 2, bits 55–70 indicate the destination address for the data contained in bits 71–80. For format 2 words, bits 1–16 indicate a destination address for the data contained in bits 17–80. For both formats 1 and 2, the address portion is divided into a port address portion (bits 1–7) and a device address portion (bits 8–16), the port address being utilized by the central router 10 to cause the data to be transferred to the correct port 24 and the device address being utilized by the concentrator 30 to transmit the data to the addressed device. Since a format 1 or format 2 word is transmitted via link 32 every 81 clock periods in the preferred embodiment of the present invention, there can be times when no data is present. No data is indicated by a NULL character which, in the preferred embodiment of the present invention, is a predetermined invalid port address.

Figure 3:
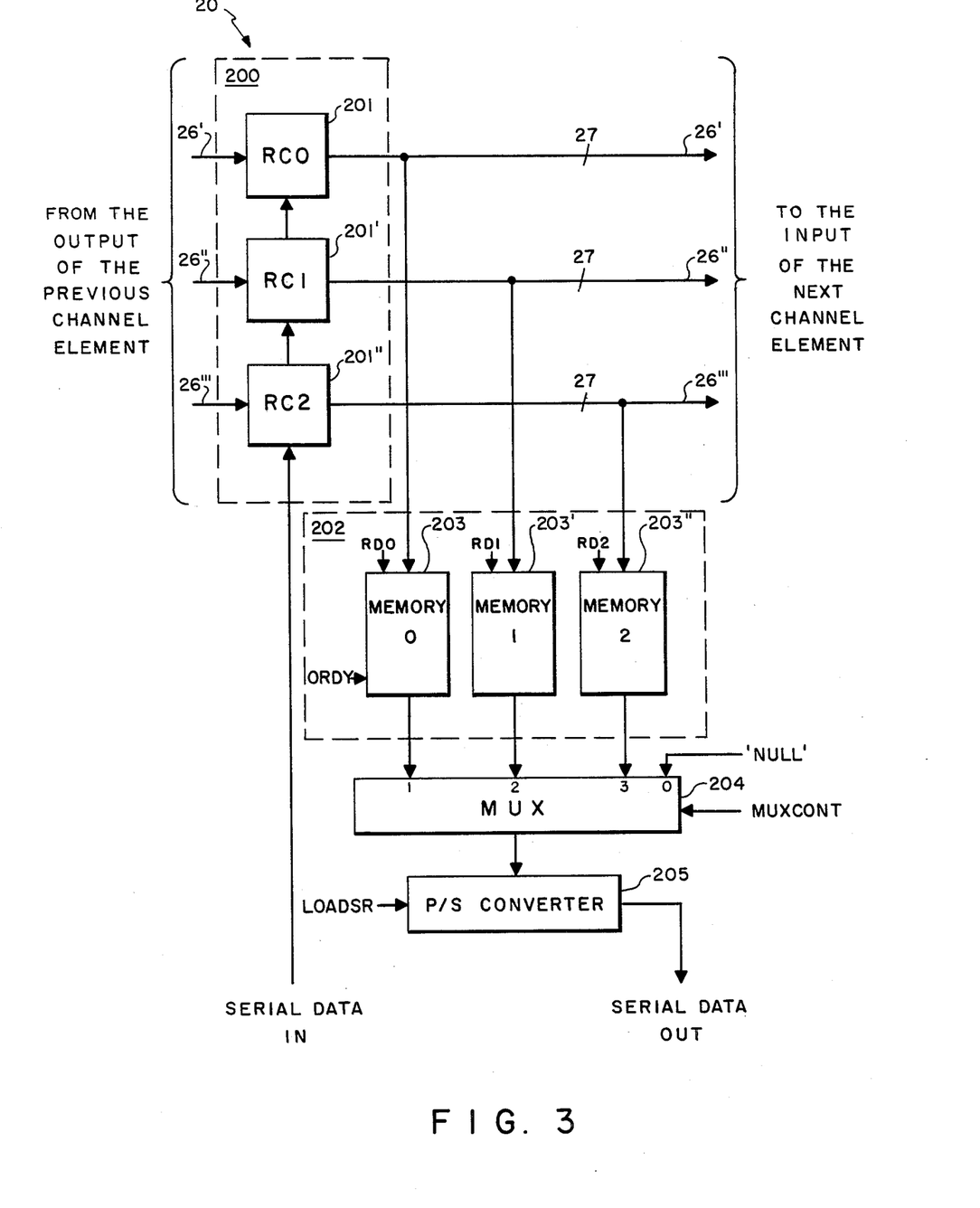
FIG. 3 shows a functional block diagram of a channel element of the preferred embodiment of the present invention.

Referring to FIG. 3, there is shown a functional block diagram of the channel element 20 of the preferred embodiment of the present invention. The channel element 20 is comprised of a router element 200 and a memory element 202. The rounter element 200 of a preferred embodiment of the present invention is comprised of 3 router chips (or more simply router) RC$\emptyset$ 201, RC1 201' and RC2 201". Each router 201 is coupled to receive input data from the previous channel equipment 20 from the respective 27 data lines 26', 26", 26''', which in part comprise the loop 26. The router element 200 also receives serial data from the concentrator 30. In the preferred embodiment of the present invention the serial data is shifted into the router chips 201 such that after 81 clock cycles the first 27 bits of the data word will reside in RC$\emptyset$ 201, the next 27 bits of the data word will reside in RC1 201', and the last 27 bits of the data word will reside in RC2 201". Since each field of the format 1 data word is 27 bits, each route chip 201 will have stored therein a single field of data.

At the end of 81 clock cycles the router chip 201 selects the data residing in the router chip 201 just received from the concentrator 30 and places that data on the loop 26. Thus, 81 bits of serial data just received is transmitted on loop 26 in parallel as a block of data. The data is shifted in parallel to the next channel element 20 each clock cycle (or clock period). At the end of 81 clock cycles the data will have looped back to the router chip 201 which originally placed the data on the loop, at which time new data is placed on the loop by the router chip 201. During the shifting of data around the loop 26, the router chip 201 is decoding the port address portion (bits 1–7) of the destination address portion (bits 1–16) of the data word. If the port address indicates an address for that channel element 20, the data is transferred to the memory element 202. Memory element 202 of the preferred embodiment of the present invention is comprised of three FIFO memories, memory $\emptyset$ 203, memory 1 203' and memory 2 203". Memory $\emptyset$ 203 is operatively coupled to the 27 output data lines 26' of router chip 201, memory 1 203' is operatively coupled to the 27 output data lines 26" of RC1 201', and memory 2 203" is operatively coupled to the 27 output data lines 26''' of RC2 201". The output of memory $\emptyset$ 203, memory 1 203', and memory 2 203" is coupled to a multiplexer (MUX) 204 which sequentially reads the data from each memory. The output of the MUX 204 is coupled to a parallel/serial converter 205 which transmits the data (SERIAL DATA OUT) to the concentrator 30.

Although the preferred embodiment shows 81 channel elements 20, the data word format is comprised of 3 data fields, the router chip 201 is divided to handle 27 bits and interfaces with a corresponding memory unit, it will be understood by those skilled in the art that other combinations may be implemented without departing from the true spirit and scope of the present invention.

The data transmission around the loop 26 is described in further detail below in conjunction with FIG. 4.

Figure 4:
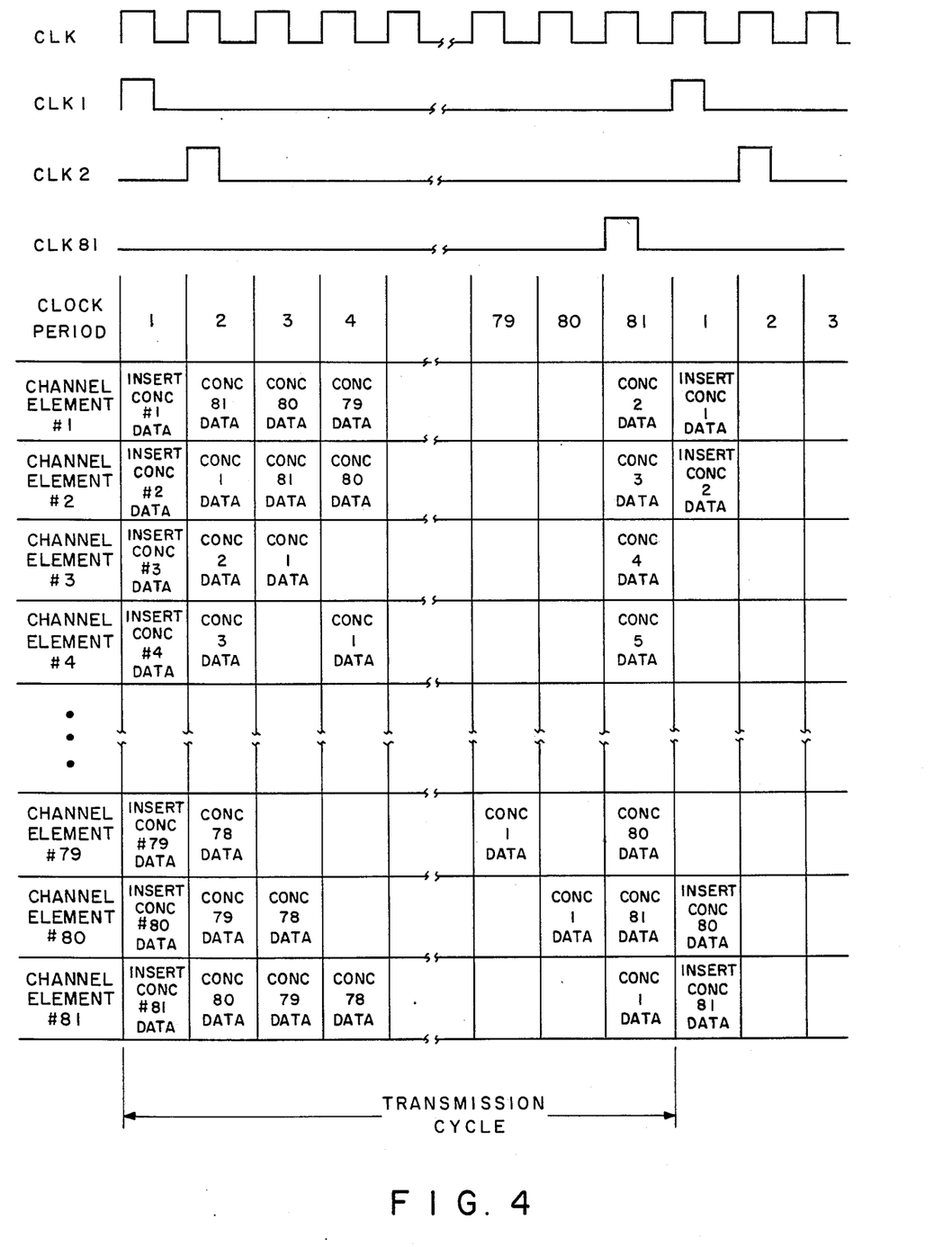
FIG. 4 shows a timing diagram of data being transmitted around a loop of the present invention.

Referring to FIG. 4, the clock signal CLK is shown, along with timing signals CLK1, CLK2, and CLK81. Timing signal CLK1 defines the first time period, or start of a complete transmission cycle, the complete transmission cycle comprising 81 clock periods. During the first clock period, data received from concentrator #1 by channel element #1 is inserted onto the loop 26 via the router element 200 associated with channel element #1. Likewise data received from concentrator #2 by channel element #2 is inserted onto the loop 26 via the router element 200 associated with the channel element #2, and so on. Thus, the data received via the channel element from its respective concentrator is inserted onto the loop via the router element associated with the respective channel element. During each clock period, the data contained in each channel element is transmitted to the next channel element, i.e., the channel element connected to the outputs of the channel element in the loop configuration. Therefore, during clock period 2, channel element #1 receives the concentrator 81 data, channel element #2 receives the concentrator #1 data, ... and finally the channel element 81 receives the concentrator 80 data. Likewise, during clock period 3, channel element #1 receives the concentrator 80 data, which was the data contained in channel element #81 during clock period 2. As can be seen from the FIG. 4, the data from concentrator #1 is transmitted to each channel element in the loop during each respective clock period until finally the concentrator 1 data has reached channel element #81 during clock period 81. Likewise, the data from every concentrator has traversed the loop in the 81 clock periods forming a complete transmission cycle. On the next clock period the transmission cycle repeats itself with the data received by each router element 200 inserted onto the loop during clock period 1. During the 81 clock periods that the data is traversing the loop, the next data from the concentrator is being loaded into the respective router element 200, the loading process which will be discussed in further detail hereinunder.

Figure 5:
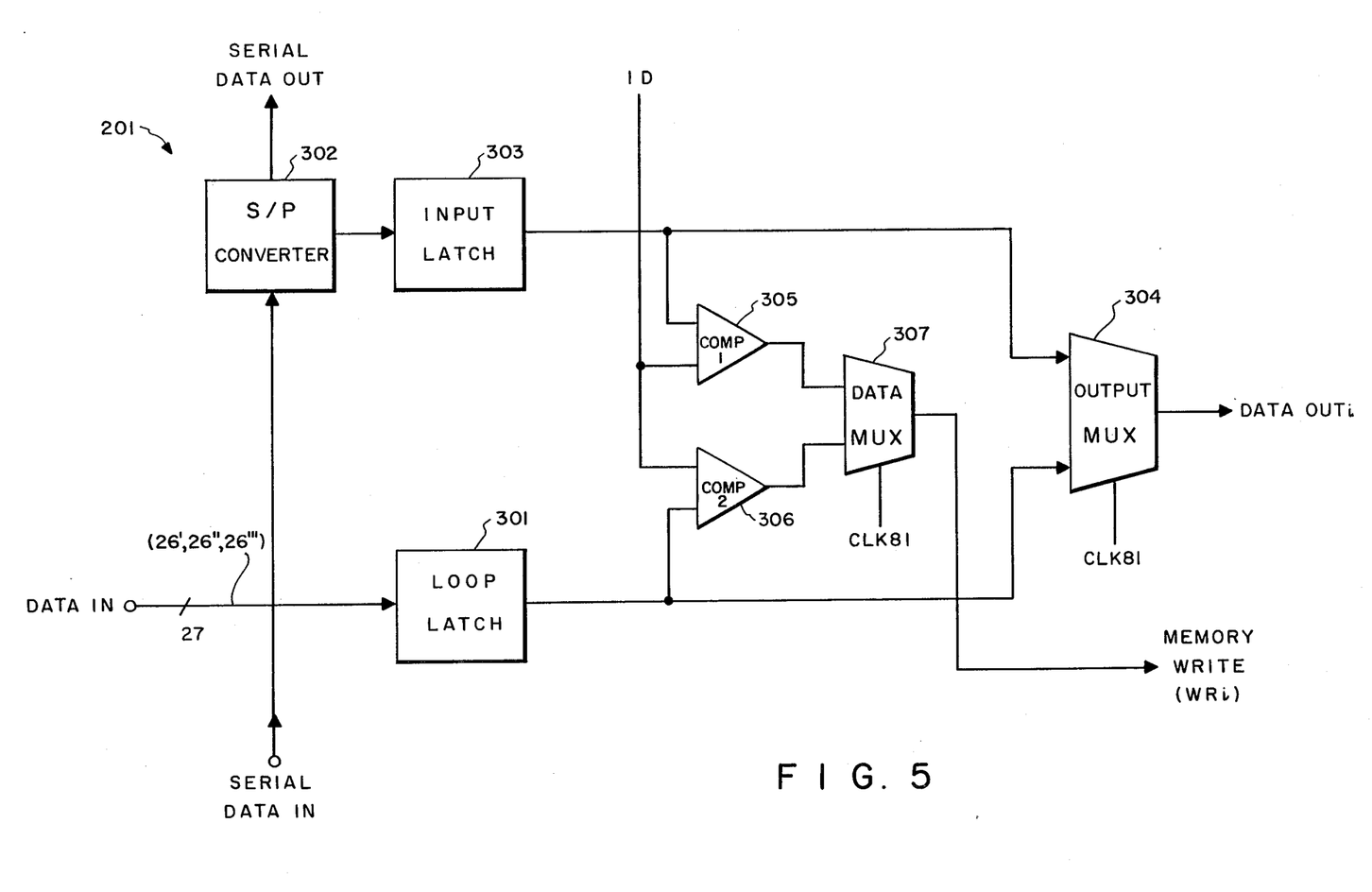
FIG. 5 shows a functional logic block diagram of a router of the preferred embodiment of the present invention.

Referring to FIG. 5, there is shown a functional logic block diagram of the router chip 201 of the preferred embodiment of the present invention. The DATA IN terminal provides for the inputting of 27 data lines (26', 26", or 26''') of loop 26. The data transmitted around the loop 26 is held in a loop latch 301 during a clock period. As described above a SERIAL DATA IN terminal receives data from the associated concentrator 30, the serial data having the format as described above. The serial data is shifted into a serial/parallel (S/P) converter 302, which in the preferred embodiment is a 27 bit wide register. A SERIAL DATA OUT terminal of S/P converter 302 of RC2 201" is coupled to the next router chip RC1 201', and likewise the SERIAL DATA OUT of the next router chip 201' is coupled to still another router chip RC0 201, thereby achieving a serial to parallel conversion of 81 bits wide sufficient to handle a data word of the transmission system of the present invention. As discussed above, in the preferred embodiment of the present invention, the router element 200 is implemented with three router chips 201, each router chip 201 of the router element 200 handling 27 of the 81 bit data word. After 81 clock periods, the serial/parallel converter 302 of each router chip 201 contains the correct 27 bits of a data word and is transferred in parallel into an input latch 303. The output of the input latch 303 and the output of the loop latch 301 are coupled to an OUTPUT MUX 304. The output of the OUTPUT MUX 304, DATA OUT i (i=0 for RC0 201, i=1 for RC1 201', and i=2 for RC2 201"), is the data from loop latch 301. However, at the end of the 81st clock period as discussed above, the OUTPUT MUX 304 is switched to select the data from the input latch 303, thereby inserting the data received from the associated concentrator 30 and the transmission of the received data around the loop 26 is started.

Each router element 200 has an ID number which is associated with the channel element 20. Thus, channel element #1 has an ID of 1, channel element #2 has an ID of 2, ..., and channel element #81 has an ID of 81. This ID also corresponds to the port number.

Each router chip 201 of a router element 200 has the same ID wired in. Thus, RC0, RC1, and RC2 for router element 200 associated with channel element #1 has an ID of 1, ..., and RC0, RC1, and RC2 for router element 200 associated with channel element #81 has an ID of 81. The ID is inputted to a first input of a first comparator 305 and the first input of a second comparator 306. The second input of first comparator 305 is operatively connected to the output of input latch 303. The second input of second comparator 306 is operatively connected to the output of loop latch 301. During clock periods, 2-81 the output of second comparator 306 will output a write control signal when the port address portion of the data word in the loop latch 301 is equal to the ID. During clock period 1 the output of first comparator 305 will output a write control signal when the port address portion of the data word in input latch 303 is equal to the ID. This permits data just written in the input latch 303 from the associated S/P converter 302 and concentrator 30 to be selected when the data is addressed to that port. The output of first comparator 305 and the output of second comparator 306 is coupled to the DATA MUX 307 which selects the output of the comparators in accordance with the clock period, thereby insuring the proper generation of the write control signal. The output of data MUX 307 is the MEMORY WRITE signal (WRi). That data is then written into the memory element 202 for subsequent transmission to the concentrator 30.

The extraction of the data from the loop 26 will now be described in conjunction with FIG. 6. Router element 200 of the preferred embodiment is shown comprising the three router chips RC0 201, RC1 201' and RC2 201", and as described above the output of the router chips is DATA0, DATA1, and DATA2, respectively. Also, each router chip 201 outputs a write control signal WR0, WR1, and WR2. DATA0 comprises the bits 0-26 of the data word. DATA1 comprises bits 27-53 of the data word and DATA2 comprises bits 54-80 of the data word. DATA0 is transmitted on the first 27 data lines 26' of loop 26, DATA1 is transmitted to the second 27 data lines 26" of loop 26, and DATA2 is transmitted on the third 27 data lines 26''' of loop 26. DATA0 is coupled to memory 0 203, DATA1 is coupled to memory 1 203', and DATA2 is coupled to memory 2 203". RAM 402 of the preferred embodiment of the present invention can be comprised of Monolithic Memories integrated circuit chip 67401.

Each memory unit 203 contains a MUX 401 and a 27 bit wide RAM 402. The "one" input of MUX0 401 is coupled to DATA0, the "one" input of MUX1 401' is coupled to DATA1, and the "one" input of MUX2 401" is coupled to DATA2. The "zero" input of MUX 401 is a null character which is switchable into the port address portion of the address field. Hence, for MUX0

401 the null character is switchable into bits 1–7, for MUX1 401' the null character is switchable into bits 28–34, and for MUX2 401" the null character is switchable into bits 55–61. The "one" input of the MUX 401 is selected when the control input C is a logic 1. The output of each MUX 401 is coupled to the data input D of the respective RAM 402. However, no data is written into the RAM 402 unless a write control signal is present at the write terminal WRT of the RAM 402.

Figure 6:
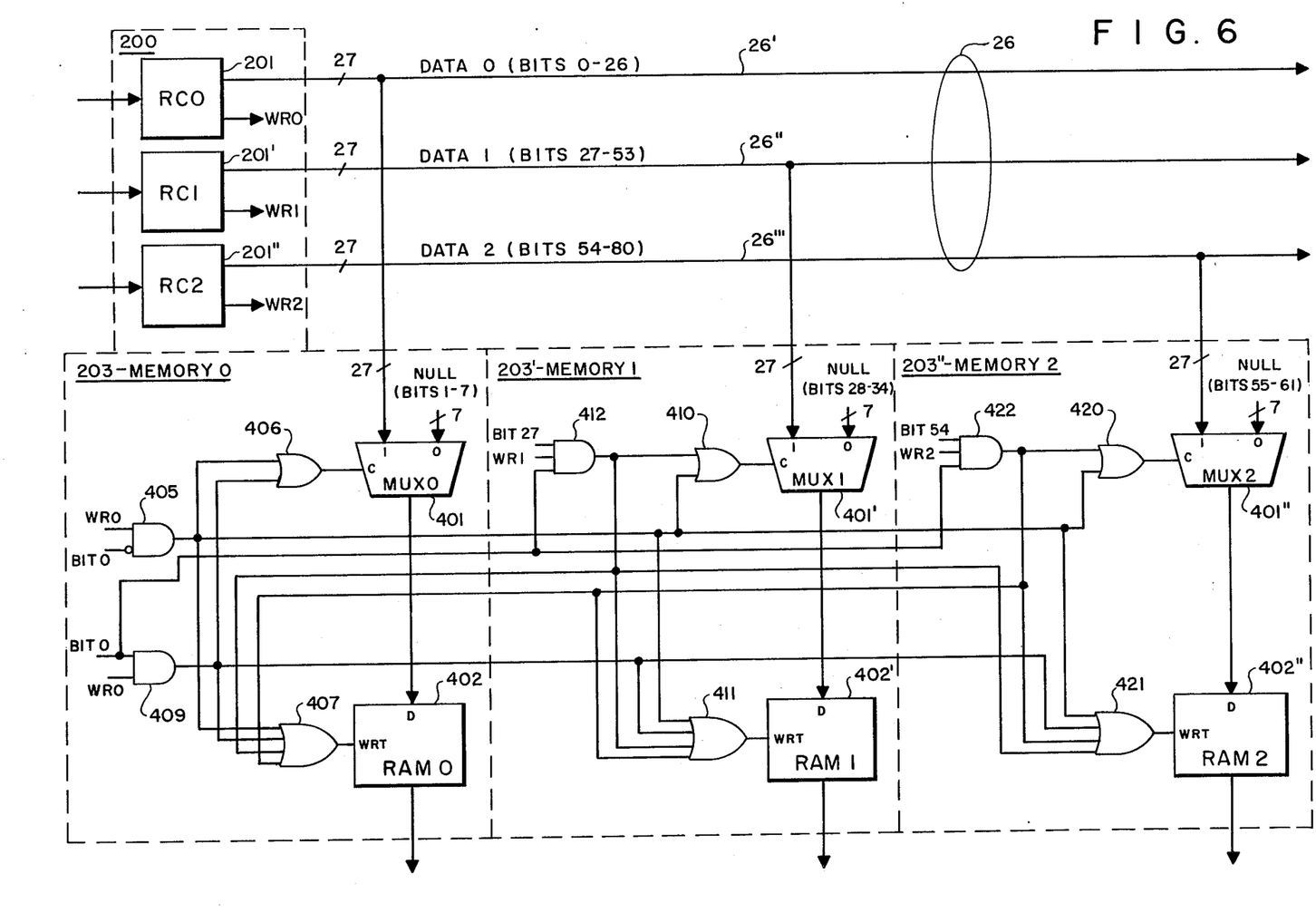
FIG. 6 shows a logic block diagram of the memory elements of the channel element of the preferred embodiment of the present invention.

The write control signal for the RAM 402 is generated by the remaining logic of memory 203 shown in FIG. 6. A null character of the preferred embodiment of the present invention is an invalid address, i.e., bit 1 and bit 2 of a 7 bit field is a logic 1 signifying a port address of 96. Since comparators 305, 306, of each router chip 201 inhibit the generation of the corresponding write control signal for invalid addresses, no check is performed on bits 1 and 2 by the logic of the memory 203 in the preferred embodiment of the present invention. For a format 2 data word, bit $\emptyset$ is a logic $\emptyset$ which is coupled to an inverting input of gate 405. If the port address portion of the data field in router element 200 equals the ID, RC$\emptyset$ 201 generates the write address signal WR$\emptyset$ which fully qualifies AND gate 405. The output of AND gate 405 is coupled to OR gate 406 and to OR gate 407 of memory $\emptyset$ 203, to OR gate 410 and to OR gate 411 of memory 1 204', and to OR gate 420 and to OR gate 421 of memory 2 203". As a result of the output of AND gate 405 being a logic 1, each MUX 401 selects the respective data input and the WRT input of each RAM 402 is enabled thereby writing the full 81 bit data word that is then present on the loop 26 into memory element 202.

When a format 1 data word is present on loop 26, bit $\emptyset$ is a logic 1, AND gate 409 will be partially enabled, and gate 405 will be disabled. (Bit $\emptyset$ is coupled to AND gate 409, to AND gate 412, and to AND gate 422.) If DATA$\emptyset$ has a port address of the channel element (field $\emptyset$ of a format word 1 has the port address of the channel element) WR$\emptyset$ will be a logic 1, and AND gate 409 will be fully enabled thereby causing MUX$\emptyset$ 401 to select DATA$\emptyset$, and further causing write signal to be present at RAM$\emptyset$ 402. The write signal will also be present at RAM1 402' and RAM2 402". However, if bit 27 is not a logic 1 and the write signal WR1 is not present (that is not a logic 1), AND gate 412 will not be enabled causing a null character to be written into RAM1 402'. Similarly, AND gate 422 will cause the null character to be written into RAM2 402" if the address portion of field 2 (or DATA2) is not equal to the channel element number, and the data present bit, bit 54, is not a logic 1.

If, for a format 1 data word field $\emptyset$ has valid data but does not contain the port address number of the channel element, WR$\emptyset$ will be a logic $\emptyset$ and the output of AND gate 409 will be a logic $\emptyset$. Hence, MUX$\emptyset$ 401 will select the null character. No writing into RAM$\emptyset$ 402 will occur unless there is a write into the other RAMS. Further, if field 1 contains valid data (bit 27 is a logic 1) and also contains the port address of the channel element, then WR1 will be a logic 1 enabling AND gate 412. This causes memory 1 to select data 1. Since the output of AND gate 412 is coupled to OR gate 411, OR gate 421, and OR gate 407, a write operation will occur for RAM$\emptyset$, RAM1, and RAM2. However, only RAM1 402' will extract the data (DATA1) from data lines 26" and be written into RAM1 402'. RAM$\emptyset$ and RAM2 will write the null character.

Similarly, for a format 1 data word, if field 2 contains valid data and also contains a port address of the channel element, DATA2 will be written into RAM2 and a null character will be written into RAM$\emptyset$ and RAM1. However, if the port address of the channel element is contained in more than one field, those fields will generate the corresponding WRi and the data will be written into the respective RAMS.

Figure 7:
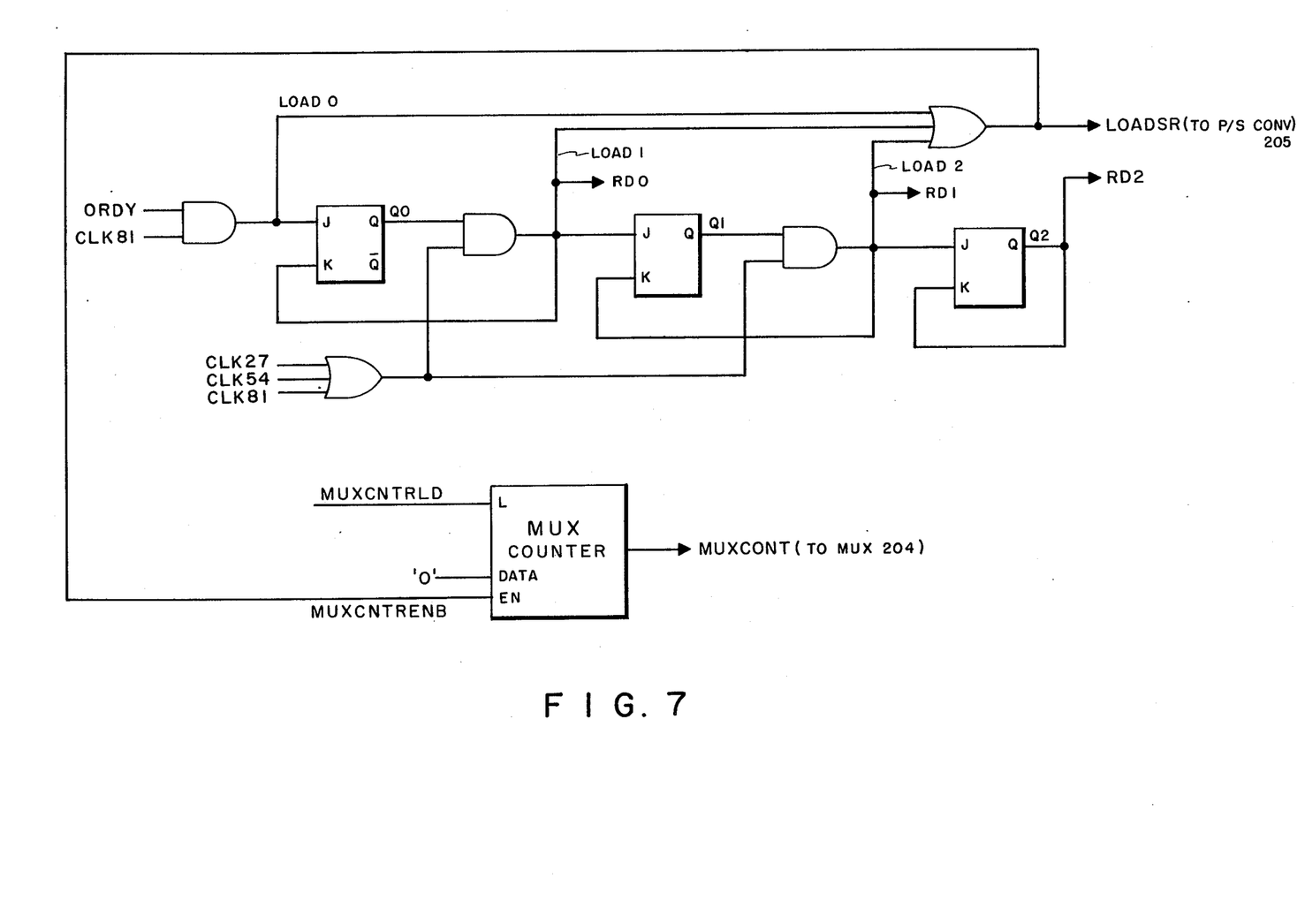
FIG. 7 shows a logic block diagram of the read logic of the memory elements of the preferred embodiment of the present invention.
Figure 8:
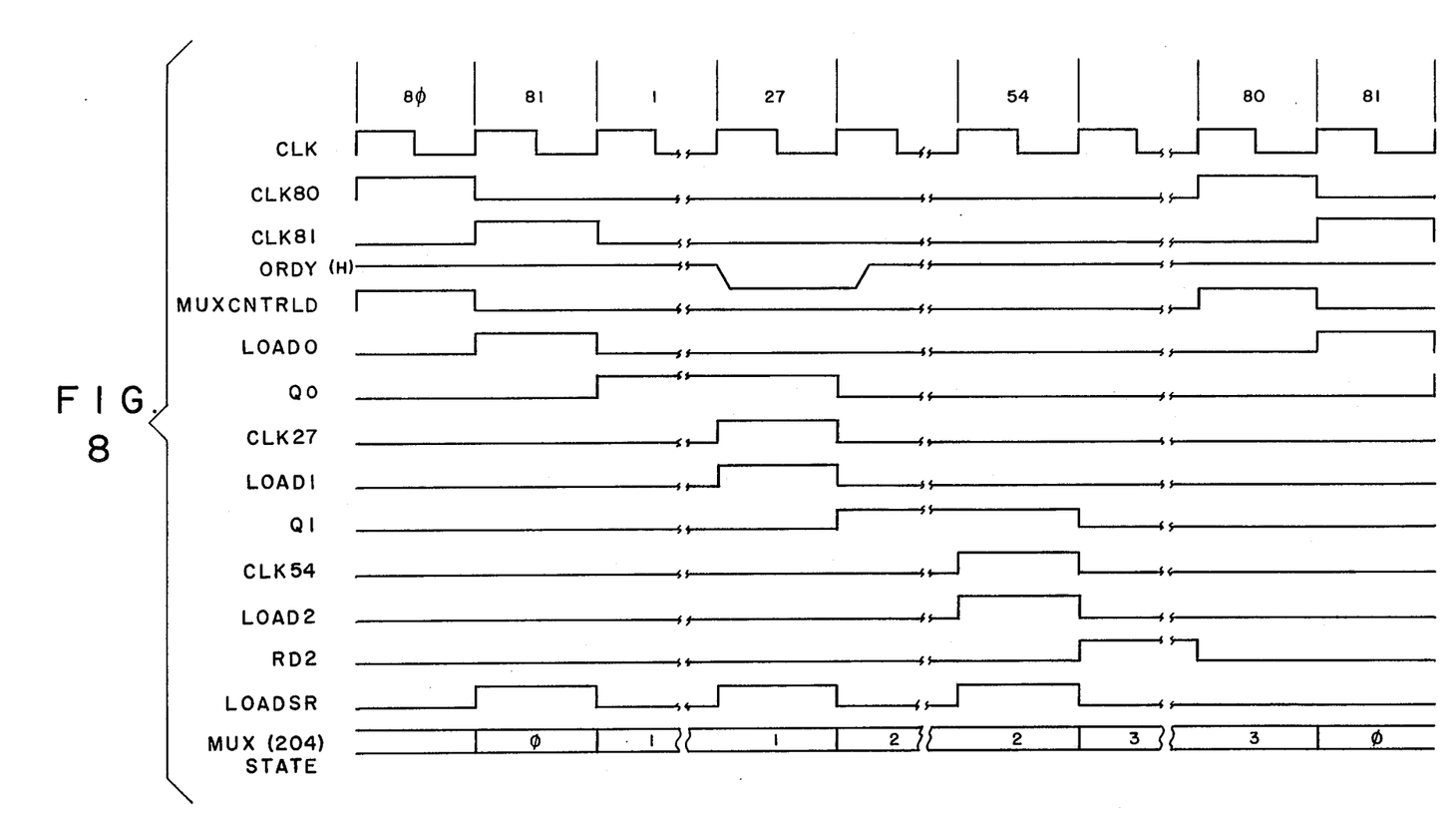
FIG. 8 shows a timing diagram of the read logic of the memory elements of FIG. 7.

FIG. 7 shows a logic block diagram of the read logic of the memory elements 203 of the preferred embodiment of the present invention. FIG. 8 shows a timing diagram of the read logic of the memory elements 203.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A data transmission system, for transmitting information from a first end-user device to a second end-user device, comprising:
    (a) a plurality of channel elements, each channel element having a first input and a first output terminal adapted to receive and transmit, respectively, serial digital data having a predetermined format, the first input and first output terminals of each channel element being operatively connected to at least one corresponding end-user device, and each channel element further having a plurality of second input terminals and a plurality of second output terminals adapted to receive and transmit, respectively, parallel digital data, wherein said channel element comprises:
        (i) router means, operatively connected to said second input terminals and operatively connected to said second output terminals, and further operatively connected to said first terminal, for coupling a new block of serial digital data onto said second output terminals at a predetermined time, otherwise coupling the parallel digital data received on said second input terminals to said second output terminals, and further examining the parallel digital data received on said second input terminals to generate a control signal when the parallel digital data is addressed to the channel element;
        (ii) memory means, operatively connected to said second output terminals, for storing the parallel digital data on said second output terminals in response to the control signal generated by said router means; and
        (iii) converter means, operatively connected to said memory means and operatively connected to said first output terminal, for converting the parallel digital data stored in said memory means to serial digital data having said predetermined format, the serial digital data being coupled to said output first terminal; and
    (b) a plurality of parallel data lines, wherein each of said parallel data lines operatively connects the second output terminals of one of said channel elements to the second input terminals of a next adjacent channel element, thereby connecting the channel elements in a ring configuration forming a ring, for causing the serial digital data received by each channel element from the corresponding end-user device to be transmitted in parallel around the ring, each channel element causing the data received via the second input terminals to be outputted serially on the first output terminal when it is determined that the data contains an address corresponding to the channel element.

2. A data transmission system, according to claim 1, wherein said router means comprises:
(a) input converter means, operatively connected to said first input terminal, for converting said serial digital data to parallel digital data;
(b) register means, operatively connected to said second input terminals, for receiving said parallel digital data from the channel element operatively connected to said second input terminals;
(c) comparator means, operatively connected to said input converter means and to said register means, for determining when said parallel digital data is addressed to the channel element; and
(d) selector means, operatively connected to said input converter means and to said register means, and further operatively connected to said second output terminals, for coupling said parallel digital data from said input converter means to said second output terminals in response to a sync signal, otherwise coupling said parallel digital data from said register means to said second output terminals.

3. A data transmission system, for transmitting information from a first end-user device to a second end-user device, comprising:
a plurality of channel element means, each channel element means having a first input and a first output terminal adapted to receive and transmit, respectively, serial digital data having a predetermined format, and each channel element means further having a plurality of second input terminals and a plurality of second output terminals adapted to receive and transmit, respectively, parallel digital data; and wherein the second output terminals of each of said channel element means is operatively connected to the second input terminals of a next adjacent channel element means thereby connecting the channel element means in a ring configuration forming a ring, each channel element means for receiving said serial digital data from a plurality of associated end-user devices and transmitting the serial digital data in parallel to the next adjacent channel element means until the parallel digital data has traversed the entire ring at which time newly received serial digital data at each channel element means is inserted onto the ring, the parallel digital data transferred around the ring being examined by each channel element means to extract the parallel digital data determined to be addressed to it, wherein said channel element means comprises:
(a) router means, operatively connected to said second input terminals and operatively connected to said second output terminals, and further operatively connected to said first input terminal, for coupling a new block of serial digital data onto said second output terminals, otherwise coupling the parallel digital data received on said second input terminals to said second output terminals, and further examining the parallel digital data received on said second input terminals to determine whether the parallel digital data addressed to the channel element means is to be extracted;
(b) memory means, operatively connected to said second output terminals, for storing the parallel digital data extracted by said router means; and
(c) converter means, operatively connected to said memory means and operatively connected to said first output terminal, for converting the parallel digital data stored in said memory means to serial digital data having said predetermined format, the serial digital data being coupled to said first output terminal.

4. A data transmission system, according to claim 3, wherein said router means comprises:
(a) input converter means, operatively connected to said first input terminal, for converting said serial digital data to parallel digital data;
(b) register means, operatively connected to said second input terminals, for receiving said parallel digital data from the channel element operatively connected to said second input terminals;
(c) comparator means, operatively connected to said input converter means and to said register means, for determining when to cause said parallel digital data to be extracted; and
(d) selector means, operatively connected to said input converter means and to said register means, and further operatively connected to said second output terminals, for coupling said parallel digital data from said input converter means to said second output terminals in response to a sync signal, otherwise coupling said parallel digital data from said register means to said second output terminals.

5. A data transmission system, for transmitting information from a sending end-user device to a receiving end-user device, comprising:
a plurality of channel elements connected in a ring configuration forming a ring, each channel element having a first input terminal and a first output terminal for receiving and transmitting, respectively, serial information, the serial information having a predetermined format which includes data and address information of the receiving end-user device, and while the serial information is being received by each channel element from corresponding end-user devices operatively connected thereto, a block of parallel data is being transmitted in parallel by each channel element to a next adjacent channel element, said block of parallel data being a predetermined quantum of serial information, such that when the block of parallel data has traversed the entire ring a new block of parallel data made up of newly received serial information is completed loading into each channel element, and said new block of parallel data of each channel element is transferred around the ring, and further, while the block of parallel data is being transmitted around the ring, each channel element extracts parallel data which it determines it is addressed to it, wherein each channel element comprises:
(a) router means, having a plurality of second input terminals adapted to receive the block of parallel data and having a plurality of second output terminals adapted to transmit the block of parallel data, and operatively connected to said first input terminal, for coupling said new block of parallel data onto said second output terminals at a predetermined time, otherwise coupling the block of parallel data received on said second input terminals to said second output terminals, the block of parallel data received on said second input terminals being examined to determine whether to extract the block of parallel data received by the channel element;

(b) memory means, operatively connected to said second output terminals, for storing the block of parallel data as determined by said router means; and (c) converter means, operatively connected to said memory means and operatively connected to said first output terminal, for converting the block of parallel data stored in said memory means to serial information having said predetermined format, the serial information being coupled to said first output terminal.

6. A data transmission system, according to claim 5, wherein said router means comprises:

(a) input converter means, operatively connected to said first input terminal, for converting said serial information to said block of parallel data;

(b) register means, operatively connected to said second input terminals, for receiving said block of parallel data from the channel element operatively connected to said second input terminals;

(c) comparator means, operatively connected to said input converter means and to said register means, for determining when to cause said block of parallel data to be extracted and (d) selector means, operatively connected to said input converter means and to said register means, and further operatively connected to said second output terminals, for coupling said block of parallel data from said input converter means to said second output terminals in response to a sync signal, otherwise coupling said block of parallel data from said register means to said second output terminals.

7. A data transmission system, according to claim 6, wherein said block of parallel data includes at least one field of data and address information, said memory means comprising:

(a) logic means, operatively connected to said second output terminals and operatively connected to said comparator means, for selectively transmitting said field of data and address information in response to at least one write control signal; and (b) FIFO memory means, operatively connected to said logic means and operatively connected to said converter means, for storing said field of data and address information selectively transmitted by said logic means.

* * * * *